United States Patent
Jährling

(10) Patent No.: US 7,503,693 B2
(45) Date of Patent: Mar. 17, 2009

(54) MOBILE X-RAY RECEIVER FOR AN X-RAY APPARATUS

(75) Inventor: Peter Jährling, Puschendorf (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 11/806,161

(22) Filed: May 30, 2007

(65) Prior Publication Data

US 2007/0280420 A1 Dec. 6, 2007

(30) Foreign Application Priority Data

May 31, 2006 (DE) .................. 10 2006 025 411

(51) Int. Cl.
*H05G 1/02* (2006.01)

(52) U.S. Cl. .............................. 378/205; 378/97

(58) Field of Classification Search ............... 378/98.8, 378/154, 155, 97, 102, 108, 205
See application file for complete search history.

(56) References Cited

U.S. PATENT DOCUMENTS

| | | | |
|---|---|---|---|
| 5,767,518 A | | 6/1998 | Samiotes et al. |
| 6,067,343 A | * | 5/2000 | Brendler et al. ............ 378/98.7 |
| 6,192,105 B1 | * | 2/2001 | Hunter et al. ............... 378/108 |
| 6,213,510 B1 | * | 4/2001 | Suyama ....................... 280/805 |
| 6,442,238 B2 | | 8/2002 | Meulenbrugge |
| 6,859,521 B2 | | 2/2005 | Spahn |
| 2002/0057762 A1 | * | 5/2002 | Tanaka et al. ............... 378/205 |
| 2002/0090055 A1 | * | 7/2002 | Zur et al. ..................... 378/154 |
| 2002/0097839 A1 | | 7/2002 | Davis |
| 2004/0101107 A1 | * | 5/2004 | Watanabe .................... 378/154 |
| 2004/0114725 A1 | * | 6/2004 | Yamamoto ................... 378/189 |
| 2006/0067474 A1 | | 3/2006 | Schmitt |

FOREIGN PATENT DOCUMENTS

DE  102 16 857 A1  11/2003
DE  10 2004 048 215 A1  4/2006

* cited by examiner

*Primary Examiner*—Hoon Song
(74) *Attorney, Agent, or Firm*—Harness, Dickey & Pierce PLC

(57) ABSTRACT

An x-ray receiver for an x-ray apparatus is disclosed. In at least one embodiment, the x-ray receiver includes a detector holding apparatus designed such that it can be connected to a detector for receiving x-rays. The x-ray receiver also includes an x-ray grid, connected to the detector holding apparatus, for reducing scattered x-rays, which is designed and arranged to attenuate scattered x-rays with at least one predetermined directional component parallel to a detector plane. In at least one embodiment, the x-ray receiver includes at least one sensor for detecting x-rays that is designed and arranged to detect x-rays striking the detector and, as a function of the detected x-rays, to generate an irradiation signal that represents an x-ray dose or x-ray intensity of the detected x-rays.

19 Claims, 2 Drawing Sheets

MOBILE X-RAY RECEIVER FOR AN X-RAY APPARATUS

PRIORITY STATEMENT

The present application hereby claims priority under 35 U.S.C. §119 on German patent application number DE 10 2006 025 411.2 filed May 31, 2006, the entire contents of which is hereby incorporated herein by reference.

FIELD

Embodiments of the invention generally relate to a mobile x-ray receiver for an x-ray apparatus.

BACKGROUND

X-ray receivers known from the prior art encounter the problem that, particularly in the case of mobile x-ray apparatuses used in traumatology, the x-ray receiver, for example an x-ray cassette with a film-foil combination or an x-ray cassette with a so-called storage foil, must be placed in the region of a patient in order to detect the patient or a part of the patient in a projection by way of x-rays. When detecting a patient by way of a previously described arrangement, the problem often arises that the correct irradiation period and/or irradiation intensity for the irradiation of a storage medium detecting the x-rays is left up to the experience of the operating personnel. This has the consequence that x-ray pictures are often poorly exposed and, as a following consequence, the patient is exposed to an increased radiation burden by repeated recordings—until a correct irradiation of the storage medium.

SUMMARY

In at least one embodiment, the invention specifies an x-ray receiver and an arrangement for detecting an object by way of x-rays that does not exhibit the problem described above.

In at least one embodiment, an x-ray receiver for an x-ray machine, includes a detector holding apparatus designed such that it can be connected to a detector for receiving x-rays. The x-ray receiver also includes an x-ray grid, connected to the detector holding apparatus, for reducing scattered x-rays, which is designed and arranged to attenuate scattered x-rays with at least one predetermined directional component parallel to a detector plane.

The x-ray receiver also includes at least one sensor for detecting x-rays that is designed and arranged to detect x-rays striking the detector and, as a function of the detected x-rays, to generate an irradiation signal that represents an x-ray dose or x-ray intensity of the detected x-rays.

Owing to the at least one sensor for detecting x-rays, which can generate an irradiation signal and, in particular, emit it on the output side, parameters of an irradiation for transirradiating an object—in particular an irradiation period, an electric charge used to generate the x-rays, or an accelerating voltage—can advantageously be controlled as a function of the irradiation signal.

In an example embodiment, the sensor of the mobile x-ray receiver is arranged in a beam path, provided for receiving the x-rays by means of the detector, in such a way as to receive the x-rays before the latter strike the detector. In the case of an x-ray receiver with a chemical detector, it is advantageously possible thereby to set a correct irradiation and/or a correct degree of blackening of the chemical detector.

In the case of a storage foil, it is thereby advantageously possible to ensure a correct irradiation of the storage foil, while in the case of a solid state detector (SD) detector matrix elements can be correctly irradiated.

It is particularly preferred for the sensor of a mobile x-ray receiver to be arranged in a beam path, provided for receiving the x-rays by way of the detector, in particular between the x-ray grid and the detector.

It is advantageously possible in this way for attenuation of an x-ray that is caused by the x-ray grid to be detected by the sensor, and thus to generate an irradiation signal that already represents an attenuation, caused by the x-ray grid, of an x-ray, in a fashion taking it into account.

As an alternative to, or independently of, the previously sketched design variant of a sensor arranged between the x-ray grid and the detector, a sensor can be arranged in a beam path, provided for receiving the x-rays by way of the detector, upstream of the x-ray grid and upstream of the detector.

In this design variant, scattered rays that are additionally caused by a ray-scattering sensor can advantageously be attenuated or eliminated by the x-ray grid.

In an advantageous design variant, the sensor is designed to detect the x-rays without substantially attenuating the x-rays. A sensor can therefore advantageously be integrated in an existing arrangement for detecting an object by way of x-rays without the need to change detection parameters, in particular irradiation parameters, already used in this arrangement.

In an example embodiment, the sensor has a sensor gas that is designed to generate at least partially free charge carriers upon detection of x-rays, in particular by way of sensor gas ion formation. In this embodiment, the sensor can be designed to generate the irradiation signal as a function of the generated free charge carriers, in particular the sensor gas ions. It is further preferred to be able to design the sensor to generate the irradiation signal as a function of the number of the free charge carriers, or of the number of the free charge carriers per time, or as a function of a charge carrier potential difference generated by the free charge carriers.

In an example embodiment, the sensor is of flat design and has a sensor surface that corresponds at least partially to a detector surface provided for receiving x-rays. It is further preferred for the mobile x-ray receiver to have at least two or more sensors that respectively have a sensor surface and whose sensor surfaces jointly correspond to the detector surface provided for irradiation with x-rays.

It is advantageously possible in this way to detect by way of transirradiation an object that has object parts which are arranged in a spatial distribution inside the object and respectively have mutually differing absorption properties for x-rays.

For example, an x-ray receiver can have a plurality of sensors, each sensor being assigned the reception of x-rays passing through a predetermined body organ. For example, an x-ray receiver can have a sensor for a right pulmonary lobe and a sensor for a left pulmonary lobe.

In an advantageous design variant, the mobile x-ray receiver has a detector with a multiplicity of detector matrix elements that are respectively designed to generate a detector signal as a function of received x-rays. Example embodiments for such a detector with a multiplicity of detector matrix elements are a solid state detector (SD), a CCD (charge-coupled device) detector, in particular with an upstream scintillator, or another radiation-sensitive semiconductor detector.

In an example embodiment, the detector matrix elements of the detector are arranged in detector rows and detector columns running transverse thereto, and the x-ray grid of the mobile x-ray receiver has attenuation elements arranged in grid rows. A dual x-ray grid can have two grids following one another in the direction of transirradiation such that the x-ray grid has grid columns in addition to the grid rows. The grid rows of the dual x-ray grid can respectively be arranged parallel to one another and transverse to the grid columns of the x-ray grid.

The x-ray grid and the detector are arranged relative to one another in such a way that the grid rows of the x-ray grid, or of a dual x-ray grid, in particular, run in a projection onto the detector plane with a transverse component relative to the detector rows and with a transverse component relative to the detector columns.

It is advantageously possible in this way to avoid moiré patterns.

In an example embodiment, in a projection onto the detector plane, the grid rows of the x-ray grid run at an angle of 45 degrees to the detector rows and detector columns.

In an advantageous design variant of the mobile x-ray receiver, the mobile x-ray receiver has an interface that is connected to the sensor, is intended for cordless connection to an x-ray machine and is designed to transmit the irradiation signal to the x-ray machine so as to control an x-ray transmitter.

Example embodiments for such an interface for cordless connection to an x-ray machine are a Bluetooth interface, an infrared interface, in particular an IRDA (IRDA=InfraRed Data Association) interface, an interface for a cordless computer network (wireless LAN), or an ultrasound interface that are respectively designed for the cordless transmission of an irradiation signal generated by the sensor to an x-ray machine in order to control an x-ray transmitter, in particular an x-ray tube.

Independently of the previously outlined cordless design variant of a mobile x-ray detector, a mobile x-ray detector can also have a corded connection for connecting the sensor to an x-ray machine. Such a corded connection can be of disconnectable design and to this end the mobile x-ray receiver can, for example, have a plug-in connection, a screwed connection or a comparable connection for producing an operational electric connection to an x-ray machine.

At least one embodiment of the invention also relates to an arrangement for detecting an object by way of x-rays. The arrangement for detecting an object by way of x-rays has an x-ray apparatus that is designed to emit x-rays, and a mobile x-ray receiver in accordance with one of the abovementioned embodiments, or a combination thereof.

The sensor of the x-ray receiver can be operationally connected to the x-ray apparatus and designed to emit the x-rays as a function of the irradiation signal.

In particular, the x-ray apparatus can have an x-ray transmitter and be designed to control an accelerating voltage or an irradiation period, or an electric current used to generate an x-radiation, or a combination thereof, as a function of a received irradiation signal.

In an advantageous development of the mobile x-ray receiver, the mobile x-ray receiver has at least one distance sensor or a part of a distance sensor that is designed to detect a distance from a position in the region of the x-ray transmitter, and to generate a distance signal that represents the distance.

The mobile x-ray receiver preferably has three distance sensors. It is further preferred for the mobile x-ray receiver to be designed to detect an alignment of the grid plane relative to an incident x-ray.

A distance sensor can have a Doppler interferometer, in particular a laser Doppler interferometer. In another embodiment, the distance sensor can be an ultrasonic distance sensor that is designed to determine a distance by detecting at least one travel time difference of an ultrasonic signal.

A part of a distance sensor can be a transmitter for electromagnetic radiation or ultrasound, or a receiver for electromagnetic radiation or ultrasound.

In the case of an alignment of the x-ray grid plane relative to a predetermined position in the region of an x-ray transmitter, it is possible by way of example for the distance sensor to be designed to generate a distance signal that represents a perpendicular alignment of the x-ray grid plane relative to an x-ray.

An arrangement for detecting an object by way of x-rays of the type described above can have a distance sensor. For example, the x-ray apparatus can generate an x-ray as a function of the distance signal.

An irradiation parameter of an x-ray transmitter can advantageously be preset by way of a distance sensor. It is further advantageously possible to set a perpendicular alignment of an x-ray receiver relative to incident x-rays with the aid of the distance sensor. The formation of shadows in an x-ray image can thereby advantageously be avoided.

A detector for receiving x-rays can be designed to change at least one of its chemical and/or electric properties as a function of a received x-radiation. Electric properties can be, in particular, a number of free charge carriers, an electric current, an electric voltage, an electrical capacitance or an electrical resistance.

Chemical properties can be, for example, an elemental silver content or a silver ion content.

Further advantageous embodiments follow from the features described in the dependent claims, and from a combination of the features described in the dependent claims.

At least one embodiment of the design variants described above solve the problem of enabling an object to be correctly detected with the aid of a mobile x-ray receiver in an x-ray arrangement without a C arm.

BRIEF DESCRIPTION OF THE DRAWINGS

The invention will now be described below by way of further example embodiments in the form of figures.

DETAILED DESCRIPTION OF THE EXAMPLE EMBODIMENTS

Figure 1:
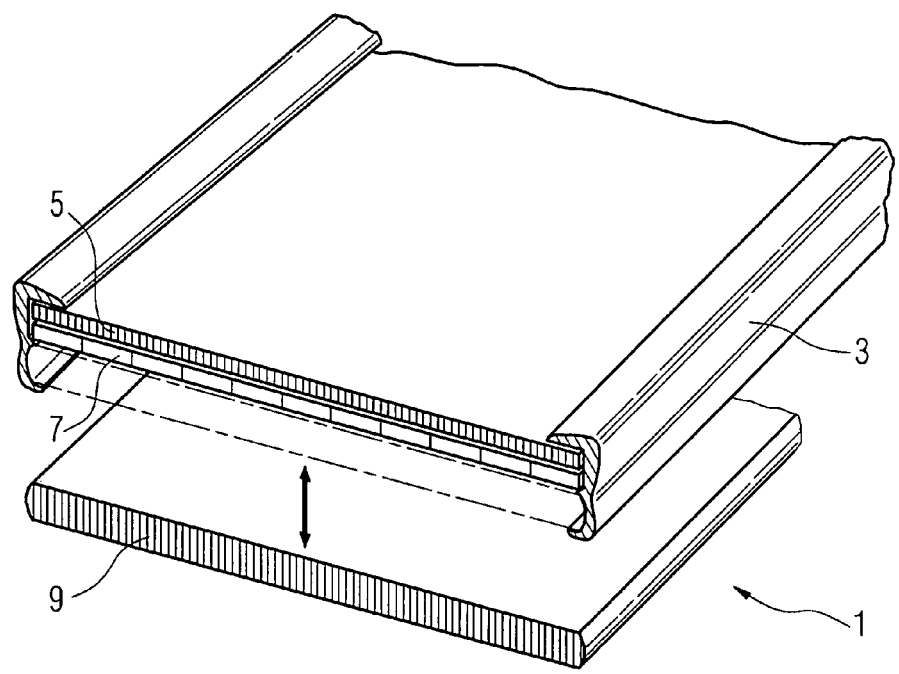
FIG. 1 shows an example embodiment of a mobile x-ray receiver having a detector and an x-ray grid that can be plugged onto the detector and is connected to a sensor.

The terminology used herein is for the purpose of describing particular embodiments only and is not intended to be limiting of the present invention. As used herein, the singular forms "a", "an", and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

In describing example embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner.

Referencing the drawings, wherein like reference numerals designate identical or corresponding parts throughout the several views, example embodiments of the present patent application are hereafter described. Like numbers refer to like elements throughout. As used herein, the terms "and/or" and "at least one of" include any and all combinations of one or more of the associated listed items.

FIG. 1 shows a schematic of an example embodiment of an x-ray receiver 1. The x-ray receiver 1 has a detector holding apparatus 3 that is designed in this example embodiment as a circumferential frame. The mobile x-ray receiver 1 also has an x-ray grid 5 that is connected to the detector holding apparatus 3. As an alternative thereto, the x-ray grid 5 can be disconnectably connected to the detector holding apparatus 3, the detector holding apparatus 3 being designed to be connected to the x-ray grid 5, and the x-ray grid 5 being designed to be connected to the detector holding apparatus 3.

In this example embodiment, the mobile x-ray receiver 1 also has a detector 9. The detector holding apparatus 3 is designed to be connected to the detector 9 in such a way that a detector surface of the detector 9 and an x-ray grid surface of the x-ray grid 5 are arranged parallel to one another.

The detector 9 is designed to be disconnectably connected by a detector holding apparatus 3.

The x-ray receiver 1 also has a sensor 7 that is arranged along an axis, perpendicular to the detector surface, between the x-ray grid 5 and the detector 9. In this exemplary embodiment, the sensor 7 is of flat design and has a sensor surface that is arranged parallel to the surface of the x-ray grid 5.

Figure 2:
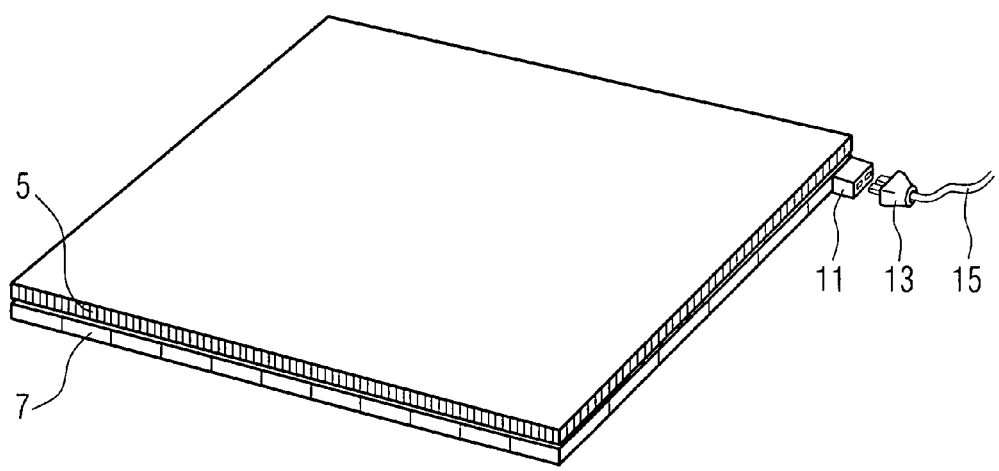
FIG. 2 shows the x-ray grid, illustrated in FIG. 1, with the sensor.

FIG. 2 shows a schematic of an example embodiment of the x-ray grid 5, partially illustrated in FIG. 1, and of the sensor 7, partially illustrated in FIG. 1. The x-ray grid 5 and the sensor 7 are arranged parallel to one another and are connected to one another in this example embodiment. The sensor 7 has an interface 11 for connection to a plug 13. The sensor 7 is designed to generate as a function of received x-rays an irradiation signal that represents an x-ray dose of the received x-rays, and to output the dose via the interface 11. Also illustrated is an electric plug 13 for connection to the interface 11, which is connected to a connecting line 15, the connecting line 15 being provided for operational connection to an x-ray apparatus for emitting x-rays, such that the x-ray apparatus, or the emission of x-rays by the x-ray apparatus, can be controlled as a function of the irradiation signal.

Figure 3:
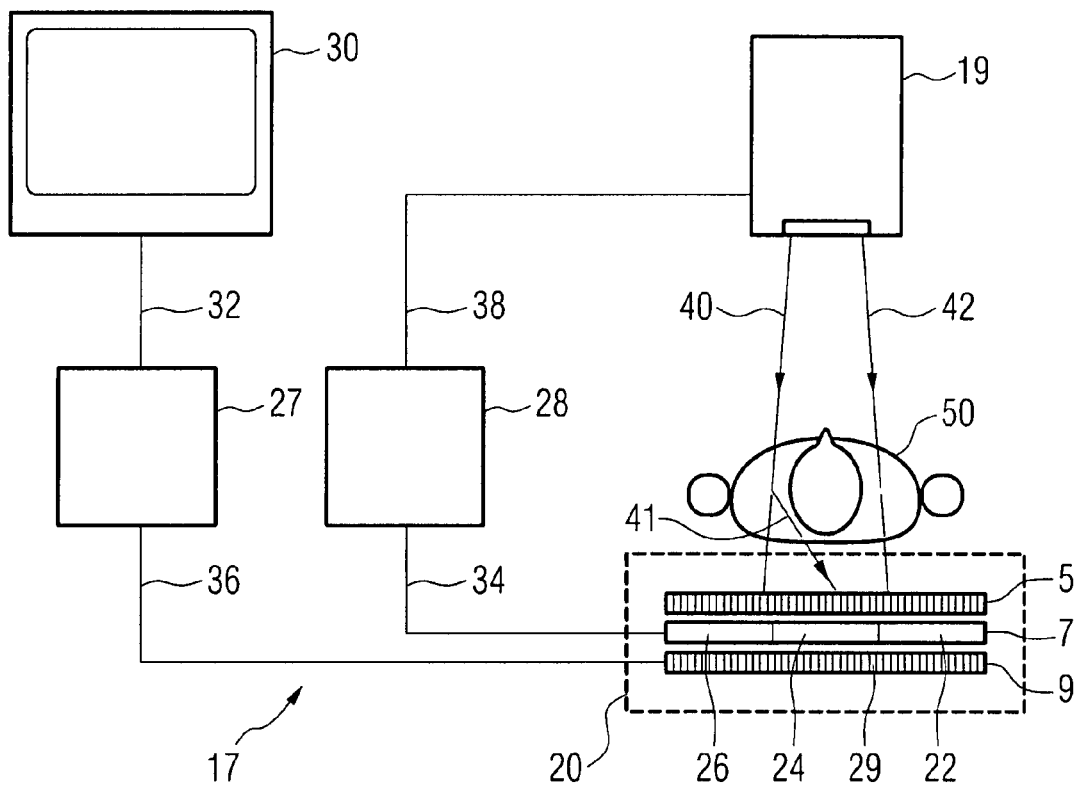
FIG. 3 shows an exemplary embodiment of an arrangement for detecting an object by way of x-rays.

FIG. 3 shows an example embodiment of an arrangement 17 for detecting an object 50 by means of x-rays 40.

The arrangement 17 also has an x-ray transmitter 19, which is designed to emit x-rays 40 and 42 for detecting an object 50. The arrangement 17 also has a mobile x-ray receiver 20—illustrated here in a sectional schematic. The mobile x-ray receiver 20 comprises the x-ray grid 5 illustrated in FIG. 1, the sensor 7 illustrated in FIG. 1, and the detector 9 for detecting x-rays, for example the x-rays 40 and 42. The x-ray grid 5, the sensor 7 and the detector 9 are respectively arranged parallel to one another and following one another in such a way that an x-ray 40 that, for example, has been projected through the object 50 and experienced attenuation there, firstly traverses the x-ray grid 5, then the sensor 7, and finally strikes the detector 9 in order to be absorbed there at least partially so as to generate a detector signal. The purpose of the design of the x-ray grid 5 is to effectively attenuate scattered x-rays, of which the scattered x-ray 41 is illustrated by way of example, that exhibit at least one predetermined directional component parallel to a detector plane, in such a way that the scattered x-ray 41 can generate no detector signal, or only a weak one, in the detector 9.

The sensor 7 has sensor elements 22, 24 and 26 that are respectively designed to generate, independently of one another as a function of detected x-rays, an irradiation signal that represents an x-ray dose or x-ray intensity of the detected x-rays.

By way of example, the sensor elements are formed by sensor gas chambers that respectively contain a sensor gas.

The detector 9 has a multiplicity of detector matrix elements 29 that are respectively designed to detect an x-ray and to generate as a function of the detected x-ray a detector signal that represents the intensity of the received x-ray.

As an alternative thereto, a detector signal can represent a number of detected x-ray quanta.

The arrangement 17 also has a control unit 28 that is operationally connected to the sensor 7. In this example embodiment, the control unit 28 is connected to the sensor 7 via a connecting line 34. The control unit 28 is connected at the output side by a connecting line 38 to the x-ray transmitter 19, and designed to generate, as a function of an irradiation signal received on the input side, a control signal for controlling the x-ray transmitter 19, and to output the control signal via the connecting line 38 to the x-ray transmitter 19 in order to control the x-ray transmitter 19. The x-ray transmitter 19 is designed to generate an x-ray 40 as a function of the control signal received on the input side and which represents, for example, an acceleration voltage, an irradiation period, or an electric charge, for example with the milliampere second as unit, and to emit the x-ray.

The arrangement 17 also has an image processing apparatus 29 that is operationally connected on the input side to the detector 9. In this example embodiment, the image processing apparatus is connected on the input side via a connecting line 36 to the detector 9. The image processing apparatus 29 is designed to generate, as a function of a detector signal received on the input side, an object signal that represents the object 50 detected by the detector 9 in a projection by way of x-rays 40, and to output said object signal on the output side. The image processing apparatus 29 is connected on the output side via a connecting line 32 to an image reproduction unit 30, and is designed to output the object signal via the connecting line 32 on the output side—in order to reproduce the object 50, represented by the object signal, by way of the image reproduction unit 30.

The image reproduction unit 30 can be a monitor, a TFT (TFT=Thin Film Transistor) display, an LCD (LCD=Liquid Crystal Display) display, or an image projector.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A mobile x-ray receiver for an x-ray apparatus, comprising:
   a detector holding apparatus, designed to connect to a detector for receiving x-rays;
   an x-ray grid, connected to the detector holding apparatus, to reduce scattered x-rays, the x-ray grid being designed and arranged to attenuate scattered x-rays with at least one predetermined directional component parallel to a detector plane; and
   at least one sensor to detect x-rays, the at least one sensor being designed and arranged to detect x-rays striking the detector and, as a function of the detected x-rays, to generate an irradiation signal that represents at least one of an x-ray dose and an x-ray intensity of the detected x-rays, wherein
   the at least one sensor being designed to generate a distance signal representing a perpendicular alignment of the x-ray grid plane to an x-ray, the x-ray grid plane aligned relative to a predetermined position in the region of an x-ray transmitter.

2. The mobile x-ray receiver as claimed in claim 1, wherein the at least one sensor is arranged in a beam path, provided for receiving the x-rays via the detector, in such a way as to receive the x-rays before the x-rays strike the detector.

3. The mobile x-ray receiver as claimed in claim 1, wherein the at least one sensor is arranged in a beam path, provided to receive the x-rays via the detector, between the x-ray grid and the detector.

4. The mobile x-ray receiver as claimed in claim 1, wherein the at least one sensor is designed to detect the x-rays without substantially attenuating the x-rays.

5. The mobile x-ray receiver as claimed in claim 1, wherein the at least one sensor includes a sensor gas that is designed to generate at least partially free charge carriers upon detection of x-rays, and to generate the irradiation signal as a function of the free charge carriers.

6. The mobile x-ray receiver as claimed in claim 1, wherein the mobile x-ray receiver includes a detector with a multiplicity of detector matrix elements that are respectively designed to generate a detector signal as a function of received x-rays.

7. The mobile x-ray receiver as claimed in claim 6, wherein the detector matrix elements of the detector are arranged in detector rows and detector columns running transverse thereto, and the x-ray grid includes attenuation elements arranged in grid rows, the x-ray grid and the detector being arranged relative to one another in such a way that the grid rows of the x-ray grid run in a projection onto the detector plane with a transverse component relative to the detector rows and with a transverse component relative to the detector columns.

8. The mobile x-ray receiver as claimed in claim 7, wherein, in a projection onto the detector plane, the grid rows of the x-ray grid run at an angle of 45 degrees to the detector rows and detector columns.

9. The mobile x-ray receiver as claimed in claim 1, wherein the mobile x-ray receiver includes an interface, connected to the sensor, for cordless connection to an x-ray machine and designed to transmit the irradiation signal to the x-ray machine so as to control an x-ray transmitter.

10. The mobile x-ray receiver as claimed in claim 1, wherein the at least one sensor being designed to detect a distance from a position in the region of the x-ray transmitter, and to generate a distance signal that represents the distance.

11. An arrangement for detecting an object via x-rays, the arrangement comprising:
    an x-ray apparatus to emit x-rays; and
    a mobile x-ray receiver as claimed in claim 1, wherein the at least one sensor of the x-ray receiver is operationally connected to the x-ray apparatus and designed to emit the x-rays as a function of the irradiation signal, and
    the at least one sensor being designed to generate a distance signal representing a perpendicular alignment of the x-ray grid plane to an x-ray, the x-ray grid plane aligned relative to a predetermined position in the region of an x-ray transmitter.

12. The mobile x-ray receiver as claimed in claim 2, wherein the at least one sensor is arranged in a beam path, provided to receive the x-rays via the detector, between the x-ray grid and the detector.

13. An arrangement for detecting an object via x-rays, the arrangement comprising:
    an x-ray apparatus to emit x-rays; and
    a mobile x-ray receiver as claimed in claim 2, wherein the at least one sensor of the x-ray receiver is operationally connected to the x-ray apparatus and designed to emit the x-rays as a function of the irradiation signal.

14. A mobile x-ray receiver for an x-ray apparatus, comprising:
    means for connecting to a detector for receiving x-rays;
    means for attenuating scattered x-rays with at least one predetermined directional component parallel to a detector plane; and
    means for detecting x-rays striking the detector and, as a function of the detected x-rays, for generating an irradiation signal that represents at least one of an x-ray dose and an x-ray intensity of the detected x-rays, wherein
    the means for detecting x-rays being designed to generate a distance signal representing a perpendicular alignment of an x-ray grid plane to an x-ray, the x-ray grid plane aligned relative to a predetermined position in the region of an x-ray transmitter.

15. The mobile x-ray receiver as claimed in claim 1, further comprising three distance sensors designed to detect an alignment of the grid plane relative to an incident x-ray.

16. The mobile x-ray receiver as claimed in claim 1, wherein the at least one sensor includes a Doppler interferometer.

17. The mobile x-ray receiver as claimed in claim 1, wherein the at least one sensor includes an ultrasonic distance sensor designed to determine a distance by detecting at least one travel time difference of an ultrasonic signal.

18. The mobile x-ray receiver as claimed in claim 17, wherein the distance sensor includes at least one of a transmitter and a receiver.

19. The mobile x-ray receiver as claimed in claim 16, wherein the at least one sensor includes at least one of a transmitter and a receiver.

* * * * *